Feb. 14, 1950     S. C. HETH ET AL     2,497,729

FEATHERING REEL CONSTRUCTION

Filed May 9, 1946

Inventors:
Sherman C. Heth &
William B. Tallman

Patented Feb. 14, 1950

2,497,729

UNITED STATES PATENT OFFICE 2,497,729

FEATHERING REEL CONSTRUCTION

Sherman C. Heth and William B. Tallman, Racine, Wis., assignors to J. I. Case Company, Racine, Wis., a corporation of Wisconsin Application May 9, 1946, Serial No. 668,403

3 Claims. (Cl. 56—226)

Our invention relates to a feathering reel construction.

One of the objects of our invention is to provide a feathering reel construction with improved means for adjusting the angular position of the reel bats.

Further objects and advantages of the invention will be apparent from the description and claims.

In the drawings, in which an embodiment of our invention is shown,

Figure 1:
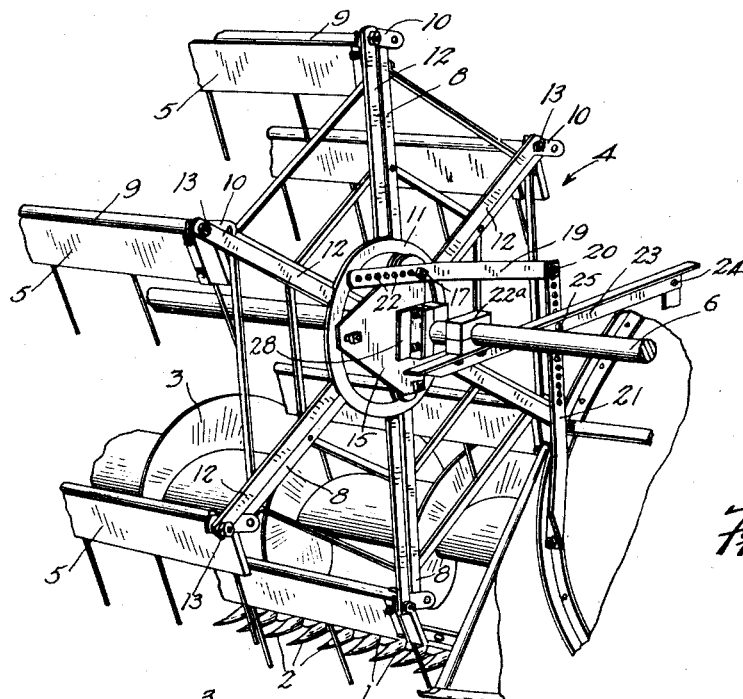
Figure 1 is a perspective view showing the feathering reel in position on a harvester.
Figure 2:
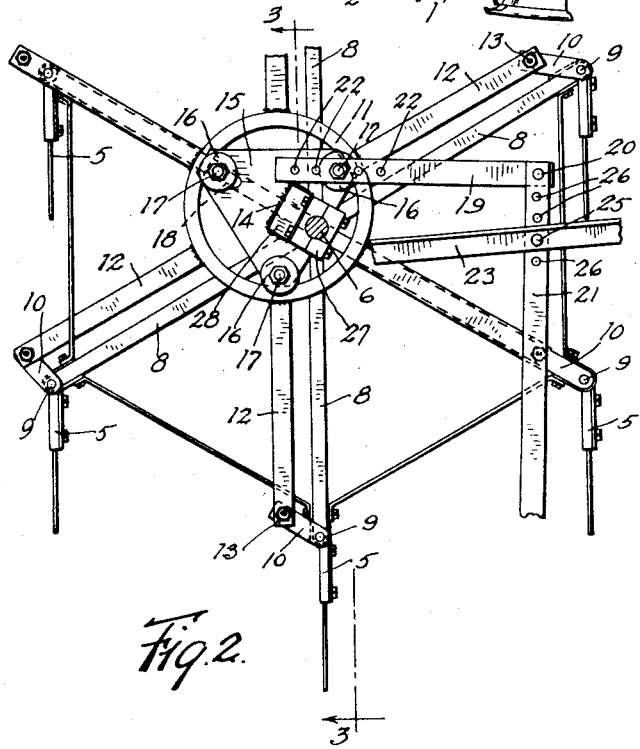
Fig. 2 is an end view of the reel construction from the right of Fig. 1.
Figure 3:
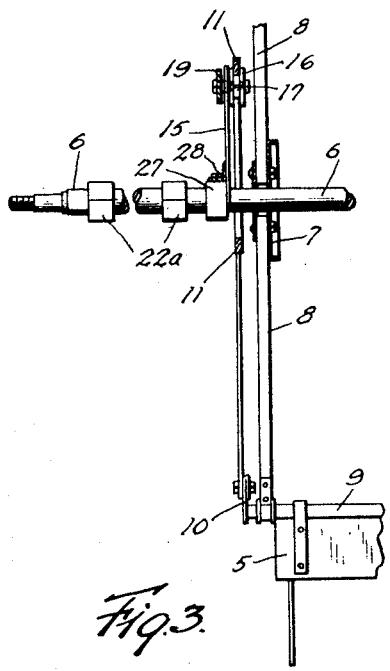
Fig. 3 is a sectional view approximately on the line 3—3 of Fig. 2.

The construction shown comprises a harvester having the usual sickle 1, guard fingers 2 and feed auger 3, and includes a feathering reel construction 4. This feathering reel construction constrains the tined grain-engaging bats 5 to maintain substantially the same angle of inclination with respect to the standing grain as the reel revolves.

The reel construction comprises a horizontal rotatable bat supporting drive shaft 6, transmission for the drive shaft (not shown), a plurality of reel hubs 7 secured to this shaft to rotate therewith, a plurality of reel arms 8 secured to these hubs and extending radially therefrom, a plurality of bat-supporting rock shafts 9 rotatably mounted at the ends of these arms, a plurality of tined reel bats 5, one secured to each of these rock shafts, a plurality of rock arms 10, one secured to each rock shaft, and control means for maintaining the angle of inclination of these rock arms.

The control means comprise a circular ring 11 surrounding the drive shaft mounted to rotate about an axis eccentric with respect to the drive shafts, and a plurality of arms 12 secured to and extending radially from this ring and pivotally secured to the rock arms 10 at 13, the centers 6, 9 and 13 and the centers of rotation 14 of the ring 11 forming substantially the corners of a parallelogram.

The means for supporting the ring for rotation comprise a generally triangular plate 15 adjustable about the axis of the shaft 6 as a center, and a plurality of flanged rollers 16, mounted on the plate 15 and engaging the inside edge of the ring 11. One of the roller-supporting bolts 17 may be made radially adjustable in a slot 18 in the plate 15 in order to secure the desired running fit of the ring 11 on the rollers 16.

The angular adjustment of the plate 15 about the shaft 6 as a center will change the angle of inclination of the bats. To enable adjustment of the plate 15, a link 19 is pivotally secured at its rear end at 20 to an upright post or strut 21, its front end being provided with a plurality of holes 22, any one of which may be made to receive the end of one of the roller-supporting bolts 17.

In order to support the reel shaft 6 for rotative movement, suitable bearings 22ª may be provided, one of these being mounted on an adjustable arm or strut 23 which may be pivoted at its rear end at 24 to a fixed support and held in different adjusted positions by means of a bolt 25 inserted through an opening in this strut and insertable into any one of a number of holes 26 provided in the upright 21.

In order to provide for the adjustment of the plate 15 about the shaft 6, a bearing block 27 is secured to the plate 15 by means of an angle bracket 28, one leg of the bracket being secured to the plate 15 and the other to the bearing.

In operation, the reel shaft 6 is driven in any suitable manner as the harvester is propelled. As the shaft 6 and the reel arms 8 revolve, the control arms 12 are forced to revolve along with the arms 8, the arms 12 being mounted to move in parallel relation with respect to the arms 8 by means of the ring 11 and control plate 15 in a well known manner.

In order to adjust the angle of the conveyor blades, the nut for the bolt 17 to which the link 19 is connected is removed, the link is slipped off the end of the bolt, the plate 15 is tilted about the shaft 6 to the desired position, and the registering opening 22 of the link 19 is made to receive the bolt 17 to hold the plate 15 in its readjusted position. As the design is such that the link 19 extends in a direction away from the reel shaft 6, this link will be under either tension or compression and hence is well able to resist any tendency of the plate 15 to rotate about the shaft 6.

Further modifications will be apparent to those skilled in the art and it is desired, therefore, that the invention be limited only by the scope of the appended claims.

Having thus described our invention, what we claim and desire to secure by Letters Patent is:

1. A rotatable feathering reel construction for harvesters comprising a rotatable reel shaft, bat-supporting means extending radially from said shaft and rotatable therewith, feathering reel bats mounted on and rotatable with respect to said bat-supporting means, crank arms movable with said reel bats, respectively, for controlling the feathering movement, a control rotor, means for mounting said control rotor for rotation about an axis eccentric with respect to the axis of said reel shaft, said control rotor having pivotal connections with said crank arms, respectively, said mounting means being rotatably adjustable about the said shaft to vary the feathering angle, means for securing said mounting means in different adjusted positions about the axis of said shaft comprising a link connected with said mounting means eccentrically with respect to said reel shaft and extending from said connection away from the reel shaft, said control rotor comprising a circular ring surrounding said shaft and said mounting means comprising a support having a plurality of rollers mounted thereon for guiding said circular ring in its rotation, and common means for mounting one of said rollers on said mounting means and securing said link to said mounting means.

2. A rotatable feathering reel construction for harvesters comprising a rotatable reel shaft, bat-supporting means extending radially from said shaft and rotatable therewith, feathering reel bats mounted on and rotatable with respect to said bat-supporting means, crank arms movable with said reel bats, respectively, for controlling the feathering movement, a control rotor, means for mounting said control rotor for rotation about an axis eccentric with respect to the axis of said reel shaft, said control rotor having pivotal connections with said crank arms, respectively, said mounting means being rotatably adjustable about the said shaft to vary the feathering angle, said control rotor comprising a circular ring surrounding said shaft and said mounting means comprising a support having three rollers mounted thereon for guiding said circular ring in its rotation and providing a three-point support therefor, one of said rollers being mounted on said support for adjustment toward and away from said shaft.

3. A rotatable feathering reel construction for harvesters comprising a rotatable reel shaft, bat-supporting means extending radially from said shaft and rotatable therewith, feathering reel bats mounted on and rotatable with respect to said bat-supporting means, crank arms movable with said reel bats, respectively, for controlling the feathering movement, a control rotor, means for mounting said control rotor for rotation about an axis eccentric with respect to the axis of said reel shaft, said control rotor having pivotal connections with said crank arms, respectively, said mounting means being rotatably adjustable about the said shaft to vary the feathering angle, said control rotor comprising a circular ring surrounding said shaft and said mounting means comprising a support having a plurality of rollers mounted thereon for guiding said circular ring in its rotation, one of said rollers being mounted on said plate for adjustment toward and away from said shaft, said link having an opening therethrough, and common means comprising a pin extending through said opening and roller on which said roller is rotatably mounted.

SHERMAN C. HETH.
WILLIAM B. TALLMAN.

REFERENCES CITED

The following references are of record in the file of this patent:

UNITED STATES PATENTS

| Number | Name | Date |
|---|---|---|
| 2,165,381 | Hume et al. | July 11, 1939 |
| 2,380,173 | Harrison | July 10, 1945 |